Aug. 29, 1961     E. L. WILSON, JR     2,998,309
DEVICE FOR CONTROLLING LEVELS IN A FLUIDIZED SYSTEM
Filed July 24, 1958
FIG. 1.
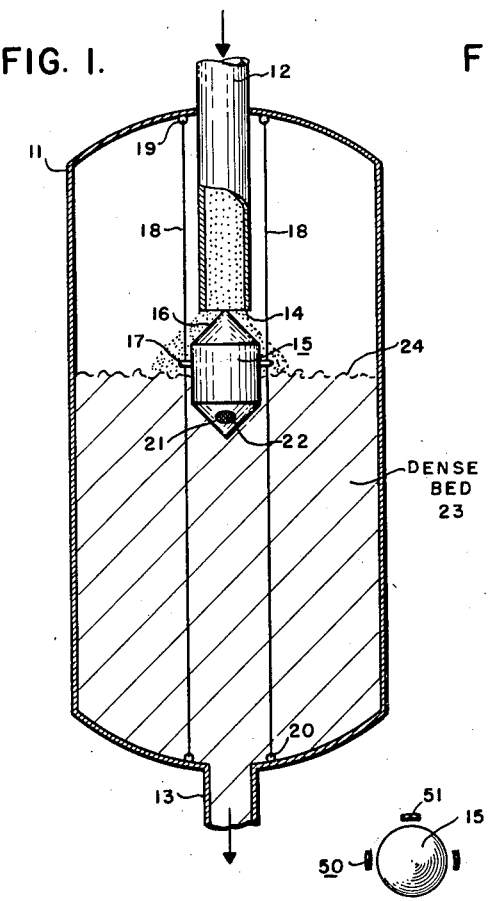
FIG. 2.
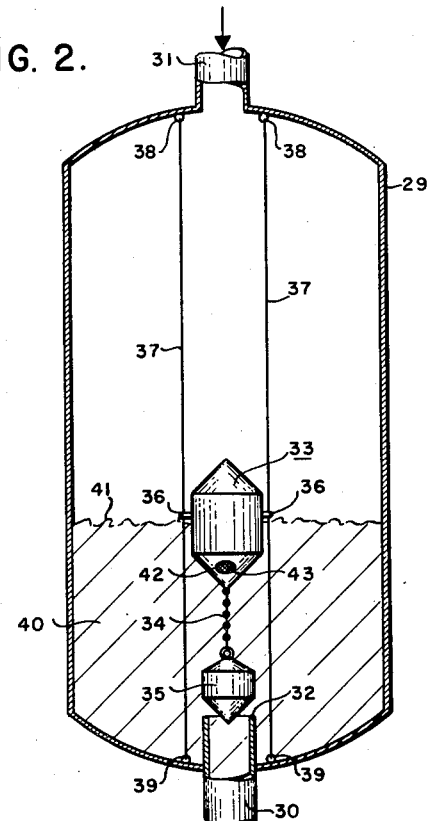
FIG. 4.
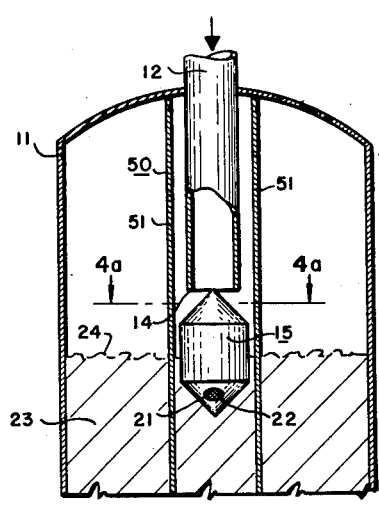
FIG. 4a.
FIG. 3.
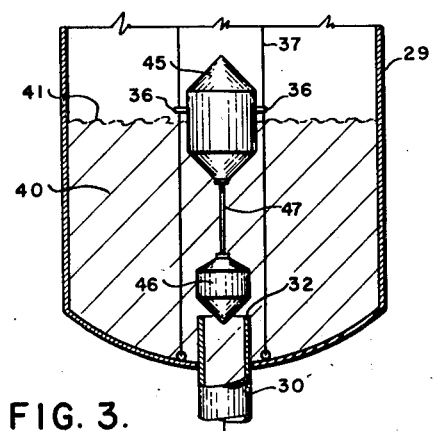
INVENTOR.
EDWARD L. WILSON JR.,
BY
ATTORNEY.

United States Patent Office 2,998,309
Patented Aug. 29, 1961

2,998,309
DEVICE FOR CONTROLLING LEVELS IN A FLUIDIZED SYSTEM
Edward Lea Wilson, Jr., Baytown, Tex., assignor, by mesne assignments, to Esso Research and Engineering Company, Elizabeth, N.J., a corporation of Delaware
Filed July 24, 1958, Ser. No. 750,778
4 Claims. (Cl. 23—288)

The present invention is directed to apparatus for controlling the level of a dense bed. More particularly, the invention is concerned with controlling the level of a fluidized dense bed in a vessel. In its more specific aspects, the invention is concerned with a level control device embodying a float which is suspended on a bed of fluidized solids.

The present invention may be briefly described as apparatus for controlling the level of a dense bed in a vessel having an inlet line for introducing finely divided solids to and an outlet line for removing finely divided solids from the vessel which includes a seating member on a selected one of the inlet or outlet lines in said vessel and a float member arranged in the vessel of sufficient buoyancy to be suspended by the dense bed and being provided with means for seating on said seating member to close the inlet or outlet line. Guide means are provided in the vessel operatively engaging with the float for guiding the vertical travel of the float with the rise and fall of the dense bed whereby the inlet or outlet line is opened and closed by the sealing means and said level is controlled.

In the practice of the present invention, it is contemplated that control may be obtained either with the inlet or outlet line of the vessel. When control is on the inlet line which is in the upper end of the vessel, the upper end of the float is formed to provide a seating means to seat on the seating member to close the inlet line. When control is on the outlet line, which is in the lower end of the vessel, a seating means may be suspended from or carried by the float to close the outlet line.

It is contemplated that the float may be hollow to make it as light as possible and may have a port covered by a filtering means for maintaining the float free of finely divided solids and to allow equalization of internal and external pressures.

The guide means may suitably be wires extending the length of the vessel operatively engaging with the float by eye members and the like or the guide may suitably be a cage which confines the float for vertical travel.

The seating means suspended from or carried by the float, when control is on the outlet line in the lower end of the vessel, may be attached to the float by a flexible member such as a light chain or a cable or other flexible means. The seating means may also be suspended from the float by a rigid member such as a rod, as may be desired.

The present invention will be further illustrated by reference to the drawing in which:

FIG. 1 is a view in partial section of a preferred embodiment;

FIG. 2 is a modification of FIG. 1 with control on the outlet line in the lower end of the vessel;

FIG. 3 is a modification of FIG. 2; and

FIGS. 4 and 4a illustrate a guide cage as the guide means.

Referring now to the drawing in which identical numerals will be employed to designate identical parts, numeral 11 designates an elongated vertical vessel having an inlet line 12 for introducing finely divided solids thereto such as catalysts and an outlet line 13 for withdrawing finely divided solids such as catalysts from the vessel 11. The inlet line 12 extends into the vessel 11 to form a seating member 14 which is adapted to be engaged by a float 15 which is formed to provide on its upper end a seating means 16 adapted to seat on the seat 14.

The float 15 is provided with eye members 17 which operatively engage with float guide means 18 which may be longitudinally extending wires which are attached to the upper end of the vessel 11 by means 19 and to the lower end of the vessel by means 20. It is to be noted that the float 15 is provided with a port 21 communicating with the interior hollow space of the float 15, the port 21 being covered by a filter 22 which prevents the entrance of finely divided solid introduced by inlet line 12 into the vessel 11 to form the dense bed 23 on the upper level 24 of which the float 15 is suspended. It is to be noted that the port 21 is arranged in the wall of the float 15 such that the port 21 is submerged in the dense bed 23.

Referring now to FIG. 2, a vessel 29 is provided with an outlet line 30 and an inlet line 31. The vessel 29 is provided with a seating member 32, which is an extension of the outlet line 30, and has arranged therein a float 33 having suspended from it by a flexible member 34 a plug 35 which forms a seating means for seating on the seating member 32. The float 33 is provided with eyes 36 operatively engaging longitudinally extending guide means 37 which are attached to the upper end of the vessel 29 by means 38 and to the lower end of the vessel 29 by means 39. Catalyst or finely divided solid is introduced into the vessel 29 by inlet 31 to form a dense bed 40 on the upper level 41 of which the float 33 is suspended. Like float 15, the float 33 is provided with a port 42 covered by a filter 43 which serves to maintain the hollow float 33 free of finely divided solids.

Referring to FIG. 3, the vessel 29 is provided with a float 45 having attached to it a plug 46 by a rigid member such as a rod 47, the plug 46 seating on the seating member 32 to close same. It is to be noted that the float 45 is guided by the guide 37 and operatively engages therewith by eyes 36. This embodiment differs from the embodiment of FIG. 2 in that in this instance the hollow float 45 is not provided with a port and the plug 46 is attached by a rigid member 47 rather than the flexible member 34 like in FIG. 2.

Referring now to FIGS. 4 and 4a, the vessel 11 is provided with a guide cage generally indicated by the numeral 50 and formed of vertically extending longitudinal members 51 such as wires, thin rods, and the like, which are attached to the interior of the vessel 11 on the upper and lower ends. In this particular instance, the float 15 is not provided with eyes such as 17 but is confined by the cage 50 for vertical travel with the rise and fall of the level 24 of the dense bed 23 to close the inlet 12 by the upper end of the float 15 seating on the seating member 14.

The present invention is quite useful and advantageous in that it provides means for maintaining a desired level of a dense bed in a vessel such as a catalytic reaction or regeneration vessel in a catalytic conversion operation employing finely divided solids. Examples of such catalytic conversion operations are catalytic cracking and hydroforming employing catalysts having particle diameters in the range from about 0 to 200 microns with a major proportion of the catalyst or finely divided solids having particle diameters in the range from about 20 to about 80 microns.

The finely divided solids or catalysts may suitably have a specific gravity in the range from about 0.5 to 3.0. For example, silica-alumina catalyst has a specific gravity of about 1.0.

The dense bed may have a density in the range from about 20 to 100 pounds per cubic foot. With silica-alumina catalyst, the dense bed may suitably have a density of 45 pounds per cubic foot.

The following equation relates the several variables of a fluidized system with respect to the size of the float employed in controlling the level of a dense bed while employing the inlet line for control:

$$F = V_{Fs}\rho_c - W_F$$

Where:

$F$ = Force exerted on float by materials in the catalyst inlet line
$V_{Fs}$ = Volume of submerged part of float
$\rho_c$ = Density of fluidized catalyst supporting float
$W_F$ = Weight of float During steady state operation the force "F" is balanced by the difference in the weight of the catalyst displaced by the float and the weight of the float. The operating limits of the control for the float are expressed by:

$$F = V_T\rho_c - W_F$$

Where:

$F$ = Force exerted on float by the materials in the catalyst inlet line
$V_T$ = Total volume of float
$\rho_c$ = Density of fluidized catalyst supporting float
$W$ = Weight of float The provision of a port covered by a filter is desirable and preferable to minimize the weight of the float and to maximize operating control. The filter allows the float to breathe with pressure and temperature changes in the vessel while preventing any solids from entering the float. The thickness of the walls of the hollow float may be maintained at a minimum since the float is designed for pressure-free operation.

The present invention is advantageous and useful in controlling systems of the nature illustrated here in that the inlet or outlet line is opened or closed without requiring any external moving parts. Furthermore, there are no lubrication problems or problems of valve parts becoming stuck and the like. As a result, trouble-free and positive control of a dense bed in a catalytic reaction vessel may be obtained which eliminates expensive and complicated level control systems heretofore used.

Mention has been made of catalytic cracking and hydroforming operations as examples of employment of the present invention. In such operations a silica-alumina catalyst may be used in catalytic cracking while a finely divided molybdenum-containing catalyst may be used for other operations such as hydroforming or a finely divided platinum-containing catalyst may be used. The invention may be used in vessels employing a hydrogen treating operation wherein a fluidized finely divided catalyst is used.

In employing the present invention, for example, in catalytic cracking, finely divided catalyst may be introduced into vessel 11 through an inlet line such as 12 provided with a float such as 15 and it is desired to control the level 24 of the dense bed 23. Catalyst having particle sizes in the range from 0 to 200 microns is introduced at a sufficient rate to form the dense bed 23 at the desired level with catalyst being withdrawn from the vessel 11 by line 13. If the level 24 builds up, the means 16 seats on member 14 closing line 12 and preventing catalyst inflow and allowing level 24 to be diminished by withdrawal of catalyst by outlet 13. If the level 24 becomes diminished then the float 15 unseats from seating member 14 and catalyst flows into the vessel to control the level 24 at the desired points.

The other embodiments operate in a similar fashion.

While examples of the application of the present invention have been given, it is to be understood that these are by way of illustration and not by way of limitation since the invention is applicable to any vessel in which a dense bed of finely divided solids is maintained.

The nature and objects of the present invention having been completely described and illustrated, what I wish to claim as new and useful and to secure by Letters Patent is:

1. Apparatus for controlling the level of a dense bed in a vessel having an inlet line in the upper end for introducing finely divided solids to and an outlet line in the lower end for removing finely divided solids from the vessel which comprises, in combination, a seating member formed by an extension of a selected one of said lines in said vessel, a buoyant float member in said vessel, said float member being hollow and adapted to be suspended by said dense bed and being provided on an end adjacent said seating member with means for seating on said seating member to close said selected line, said float member having a port covered by a filtering means for maintaining said float free of finely divided solids, said port being arranged in the wall of said float member such that the port is submerged in said dense bed, and vertically extending guide means connected to the upper and lower ends of, and arranged in said vessel to form a cage around said seating member, said float member being arranged within said cage, the vertical travel of said float member being guided by said cage with the rise and fall of said dense bed toward and away from said seating member whereby the selected line is opened and closed and said level is controlled.

2. Apparatus for controlling the level of a dense bed in a vessel having an inlet line in its upper end for introducing finely divided solids to and an outlet line in its lower end for removing finely divided solids from the vessel which comprises, in combination, a seating member formed by an extension of said inlet line in said vessel, a buoyant float member in said vessel, said float member being hollow and adapted to be suspended by said dense bed and being provided on an end adjacent said seating member with means on its upper end for seating on said seating member to close said inlet line, said float member having a port covered by a filtering means for maintaining said float member free of finely divided solids, said port being arranged in the wall of said float member such that the port is submerged in said dense bed, and vertically extending guide means connected to the upper and lower ends of, and arranged in said vessel to form a cage around said seating member, said float member being arranged within said cage, the vertical travel of said float member being guided by said cage with the rise and fall of said dense bed toward and away from said seating member whereby the inlet line is opened and closed and said level is controlled.

3. Apparatus for controlling the level of a dense bed in a vessel having an inlet line in its upper end for introducing finely divided solids to and an outlet line in its lower end for removing finely divided solids from the vessel which comprises, in combination, a seating member formed by an extension of said outlet line in said vessel, a buoyant float member in said vessel, said float member being hollow and adapted to be suspended by said dense bed and being provided on an end adjacent said seating member with means on its lower end for seating on said seating member to close said outlet line, said float member having a port covered by a filtering means for maintaining said float free of finely divided solids, said port being arranged in the wall of said float member such that the port is submerged in said dense bed, and vertically extending guide means connected to the upper and lower ends of, and arranged in said vessel to form a cage around said seating member, said float member being arranged within said cage, the vertical travel of said float member being guided by said cage with the rise and fall of said dense bed toward and away from said seating member whereby the outlet line is opened and closed and said level is controlled.

4. Apparatus for controlling the level of a dense bed, which comprises, in combination, an elongated vertical vessel having an inlet line in its upper end for introducing finely divided solids to and an outlet line in its lower end for removing finely divided solids from the vessel to form said dense bed, a seating member formed by an extension of said inlet line in said vessel, a buoyant float member in said vessel, said float member being hollow and adapted to be suspended by said dense bed and being provided on an end adjacent said seating member with means for seating on said seating member to close said inlet line, said float member having a port covered by a filtering means for maintaining said float member free of finely divided solids, said port being arranged in the wall of said float member such that the port is submerged in said dense bed, and vertically extending guide means connected to the upper and lower ends of, and arranged in said vessel to form a cage around said seating member, said float member being arranged within said cage, the vertical travel of said float member being guided by said cage with the rise and fall of said dense bed toward and away from said seating member whereby the inlet line is opened and closed and said level is controlled.

References Cited in the file of this patent

UNITED STATES PATENTS

| | | |
|---|---|---|
| 469,149 | Kimball | Feb. 16, 1892 |
| 635,703 | St. Mary | Oct. 23, 1899 |
| 763,115 | Robinson | June 21, 1904 |
| 1,013,463 | Tozier | Jan. 2, 1912 |
| 1,149,675 | Nix | Aug. 10, 1915 |
| 2,375,406 | Drown | May 8, 1945 |
| 2,417,976 | Franklin | Mar. 25, 1947 |
| 2,582,819 | Daily | Jan. 15, 1952 |
| 2,687,343 | Crask | Aug. 24, 1954 |
| 2,695,029 | Brugger | Nov. 23, 1954 |
| 2,710,666 | May | June 14, 1955 |
| 2,741,546 | Sweeney et al. | Apr. 10, 1956 |
| 2,793,648 | Brown | May 28, 1957 |

OTHER REFERENCES

"Improving Solids-Gas Contacting by Fluidization," Chem. and Metallurgical Engineering, June 1944, pages 94 to 98.